(12) United States Patent
Yu

(10) Patent No.: US 6,734,931 B2
(45) Date of Patent: May 11, 2004

(54) COLOR FILTER SUBSTRATE HAVING IDENTIFICATION MARK FORMED IN THE BLACK MATRIX

(75) Inventor: Hwan-Seong Yu, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 7 days.

(21) Appl. No.: 09/785,456

(22) Filed: Feb. 20, 2001

(65) Prior Publication Data
US 2001/0022637 A1 Sep. 20, 2001

(30) Foreign Application Priority Data
Feb. 18, 2000 (KR) .......................................... 2000-7714

(51) Int. Cl.[7] ..................... G02F 1/1335; G02F 1/1333; G02F 1/13
(52) U.S. Cl. ....................... 349/106; 349/110; 349/187; 349/192
(58) Field of Search ................. 349/106, 187, 349/110, 158, 54, 55, 192; 324/770; 356/399, 400, 401

(56) References Cited

U.S. PATENT DOCUMENTS

| | | | | |
|---|---|---|---|---|
| 4,343,877 A | * | 8/1982 | Chiang ........................ 257/48 |
| 5,361,150 A | | 11/1994 | Noguchi | |
| 5,760,421 A | * | 6/1998 | Takahashi et al. ............ 257/59 |
| 6,597,427 B1 | * | 7/2003 | Katsu et al. ................. 349/190 |

FOREIGN PATENT DOCUMENTS

JP  2-210402  * 8/1990

* cited by examiner

*Primary Examiner*—Tarifur R. Chowdhury
(74) *Attorney, Agent, or Firm*—McKenna Long & Aldridge LLP

(57) ABSTRACT

A color filter substrate includes a black matrix and red, green and blue color filters. The color filter substrate has an identification mark formed in the black matrix such that the information about the color filter substrate is easily recognized. The identification mark includes such information as the manufacturer, color filter type, fabrication method and/or type of black matrix.

23 Claims, 4 Drawing Sheets

COLOR FILTER SUBSTRATE HAVING IDENTIFICATION MARK FORMED IN THE BLACK MATRIX

This application claims the benefit of Korean Patent Application No. 2000-7714, filed on Feb. 18, 2000, under 35 U.S.C. §119, the entirety of which is hereby incorporated by reference as if fully set forth herein.

BACKGROUND OF THE INVENTION

1. Field of the Invention

The present invention relates to a liquid crystal display (LCD) device, and more particularly, to an LCD having a color filter substrate with an identification mark.

2. Description of the Related Art

The cathode-ray tube (CRT) was developed and is mainly used for the display systems. However, the flat panel display is beginning to make its appearance due to the demand for small dimension, low weight and low voltage power consumption. At present, the thin film transistor-liquid crystal display (TFT-LCD) having a high resolution has been developed.

In general, LCD devices have various advantages in that, for example, they are thin and require low power, when compared to the CRT display devices. Therefore, such LCD devices might be good candidates to replace CRT display devices and have been a matter of great interest in some industry fields.

FIG. 1 is a schematic view illustrating a typical liquid crystal display (LCD) device. As shown in FIG. 1, the LCD device 11 includes upper and lower substrates 5 and 22 and an interposed liquid crystal material 14. The upper substrate 5, referred to as a color filter substrate, includes color filters 7, a black matrix 6 and a transparent common electrode 18 formed on the color filter 7. The color filter 7 and the black matrix 6 are positioned in the same layer between the upper substrate 5 and the transparent common electrode 18. The lower substrate 22, referred to as an array substrate, includes pixel regions "P" defined by the gate and data lines 13 and 15, pixel electrodes 17 formed on the pixel regions "P", gate lines 13 arranged in a transverse direction, data lines 15 arranged in a perpendicular direction to the gate lines 13, and thin film transistors (TFTs) "T" arranged near the crossing of the gate and data lines 13 and 15 in a matrix type. The pixel electrodes 17 are made of a transparent conductive material such as ITO (indium-tin-oxide). As described, the color filter layer is formed on the upper substrate and serves to display full color.

FIG. 2 is a schematic plan view illustrating a conventional color filter substrate. As shown, the color filter substrate 31 comprises a transparent substrate (not shown), a black matrix 33, an overcoat layer (not shown), a transparent common electrode (not shown) and color filters 35 that are red "R", green "G" and blue "B". In general, the overcoat layer is formed between the color filters and the transparent common electrode. The component elements of the color filter substrate are optional in accordance with the LCD device type and operating mode. One pixel of the color filter is generally hundreds of square micrometers and a human being can not recognize it. Accordingly, the color filter is called a micro color filter.

The color filters 35 are formed from organic substances. The method of forming the color filters for use in a TFT-LCD device is classified into a dyeing method and a pigment dispersion method in accordance with the type of organic substance. Moreover, the method of forming the color filters is also classified into a dyeing method, a dispersion method, an electro-deposition method and a printing method. However, the pigment dispersion method is most widely employed in fabricating the color filters.

The black matrix 33 is generally positioned between color filters 35 having red, green and blue colors. The black matrix 33 includes portions corresponding to portions of the array substrate (see 22 of FIG. 1) that adhere to the color filter substrate when assembling the pair of substrates. The black matrix 33 is also used for shielding the reverse tilted domain formed around the pixel electrode in an in-plane switching LCD device, for example. Moreover, the black matrix 33 shields the TFT (see "T" of FIG. 1) from the light to minimize leakage current in the TFT. A metal thin film such as chrome having an optical density more than 3.5 and a carbon-base organic material are mainly used for the black matrix 33. A double-layer black matrix, for example, chrome/chrome oxide (Cr/CrOx) is used to lower the reflection of the LCD device screen.

The color filter substrate 31 described above is aligned and assembled with the array substrate (see element 22 of FIG. 1). In order to assemble and align the color filter substrate 31 with the array substrate, alignment keys are formed on the color filter substrate and on the array substrate at the same position. Thus, an accurate alignment of the color filter substrate and the array substrate is obtained using the alignment keys. The alignment key 37 is formed on the color filter substrate 31 when patterning the black matrix 33.

However, when fabricating the LCD device with the color filter substrate 31 and the array substrate (see 22 of FIG. 1), information about the color filter such as the manufacturing company and/or the color filter type can not be identified after the scribing and cutting steps. If a defect is found in the color filter substrate, additional steps for confirming and identifying the color filter are thus required in order to send the color filter substrate back to the manufacturer. Accordingly, productivity becomes poor and the yield is lower.

Moreover, the color filter type among the various types is chosen depending on the operation mode, and the color filter is not identified during the fabrication process of the LCD. If a wrong type of color filter is used, a complicated and labor intensive work is needed to confirm and identify the color filter after completing the LCD device.

SUMMARY OF THE INVENTION

Accordingly, the present invention is directed to a color filter substrate having an identification mark that substantially obviates one or more of the problems due to limitations and disadvantages of the related art.

An advantage of the present invention is a method of fabricating a color filter substrate having an identification mark for use in a liquid crystal display (LCD) device.

Additional features and advantages of the invention will be set forth in the description that follows, and in part will be apparent from that description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a color filter substrate for use in a liquid crystal display device includes forming a black matrix on a substrate, the black matrix having a identification mark and an alignment key; forming patterns for color filters in the black matrix; and forming red, green and blue color filters in the patterns of the black matrix.

The black matrix is made of chrome (Cr) or a resin including carbon. The identification mark includes a sign or a symbol such as characters or numbers. The sign denotes a manufacturer, a color filter type, a fabricating method and/or type of black matrix. Moreover, the identification mark and the alignment key are formed at periphery of the substrate.

In another aspect of the present invention, a color filter substrate for use in a liquid crystal display device includes a substrate; a black matrix formed on the substrate; red, green and blue color filters; and an identification mark formed at a periphery of the substrate. The color filter substrate further includes an alignment key formed at a periphery of the substrate. The identification mark is formed by patterning the black matrix.

In another aspect of the present invention, a method of fabricating a liquid crystal display device, the method comprises forming a black matrix on a first substrate, the black matrix having an identification mark at a periphery of the first substrate; forming a pattern in the black matrix corresponding to color filters; forming the color filters in the pattern of the black matrix; forming a transparent conductive layer over the color filters; and assembling the first substrate to a second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to the preferred embodiment of the present invention, examples of which are illustrated in the accompanying drawings.

Figure 3:
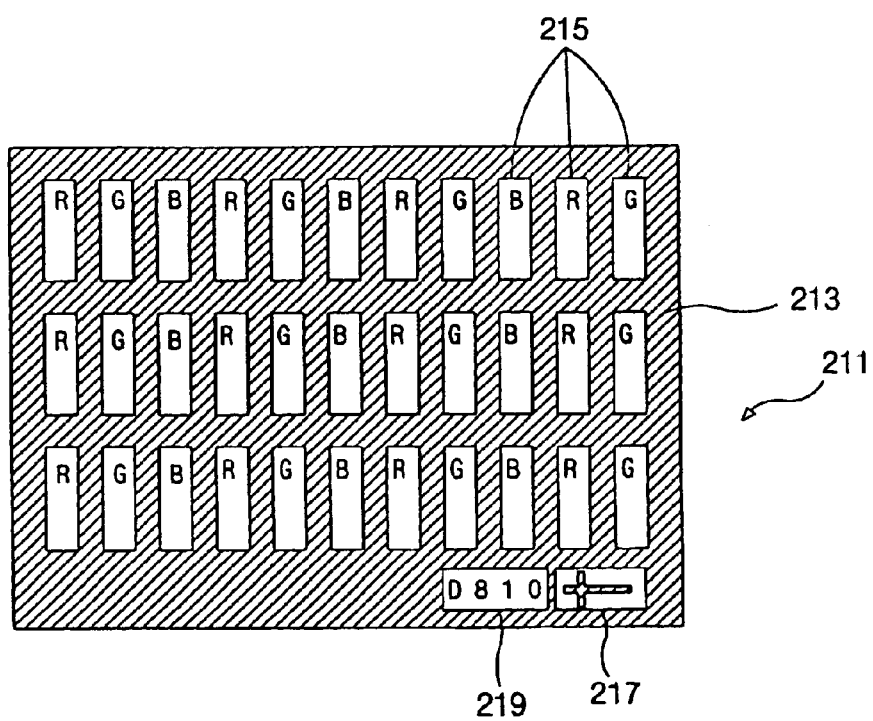
FIG. 3 is a schematic plan view illustrating a color filter substrate according to a preferred embodiment of the present invention.

FIG. 3 is a plan view illustrating a color filter substrate according to a preferred embodiment of the present invention. As shown, the color filter substrate 211 comprises a transparent substrate (not shown), a black matrix 213, an overcoat layer (not shown), a transparent common electrode (not shown) and color filters 215 that are red "R", green "G" and blue "B". The color filter substrate 211 includes portions that do not necessarily affect the image display. An alignment key 217 and an identification mark 219 are preferably formed at portions that do not affect the image display.

In this example, the identification mark 219 has a sign "D810" which may represent information about the color filter as follows:

the character "D" denotes the manufacturer of the color filter;

the number "8" denotes the color filter type;

the number "1" denotes the fabricating method of the color filter; and the number "0" denotes the type of black matrix.

As described above, the information about the color filter can be checked and identified using the identification mark 219. Moreover, the identification mark 219 can have many forms including a variety of different information. The identification mark 219 is preferably simultaneously patterned when patterning the black matrix 213.

Hereinafter, the manufacturing process of the color filter substrate will be explained according to the present invention with reference to FIGS. 4A and 4B.

Figure 1:
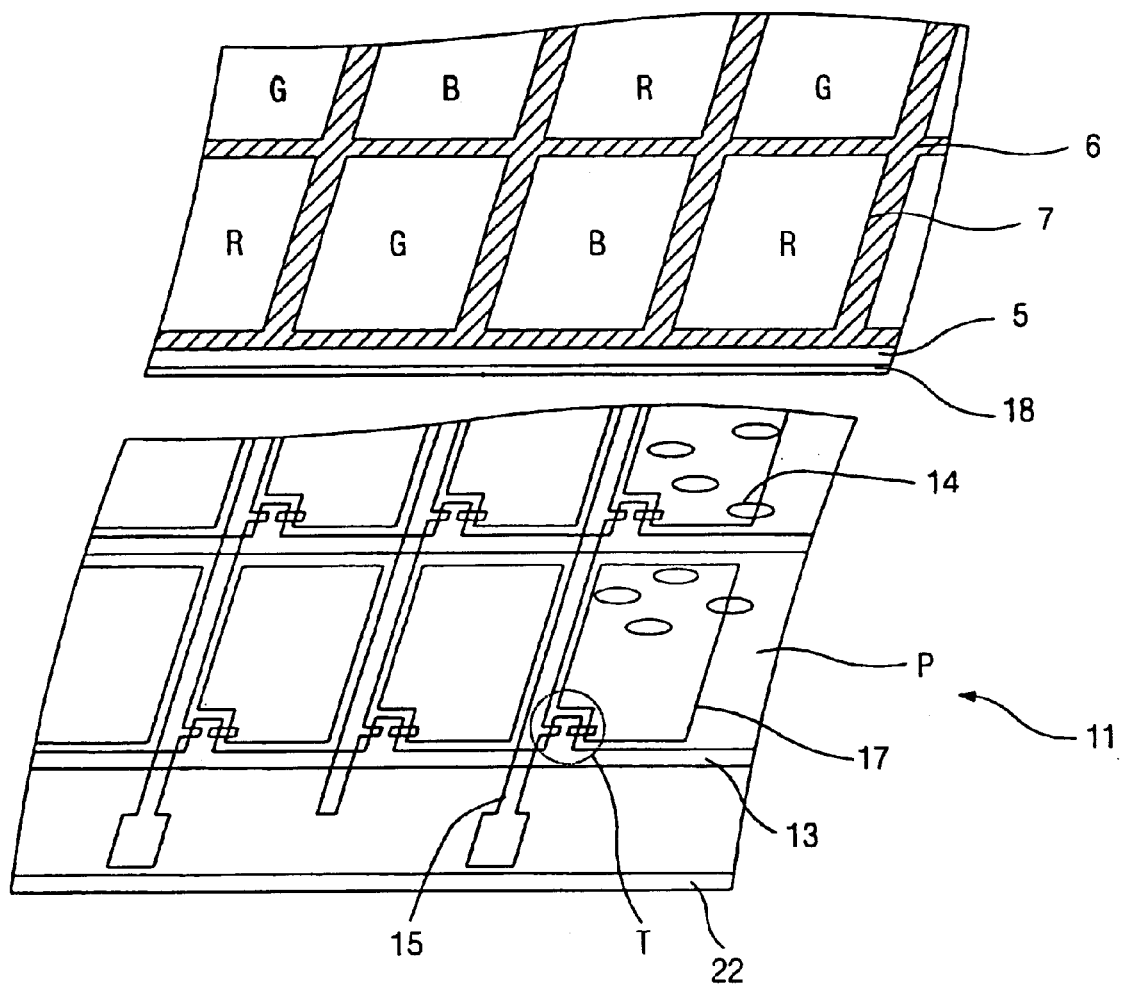
FIG. 1 is a schematic perspective view illustrating a conventional liquid crystal display device.
Figure 2:
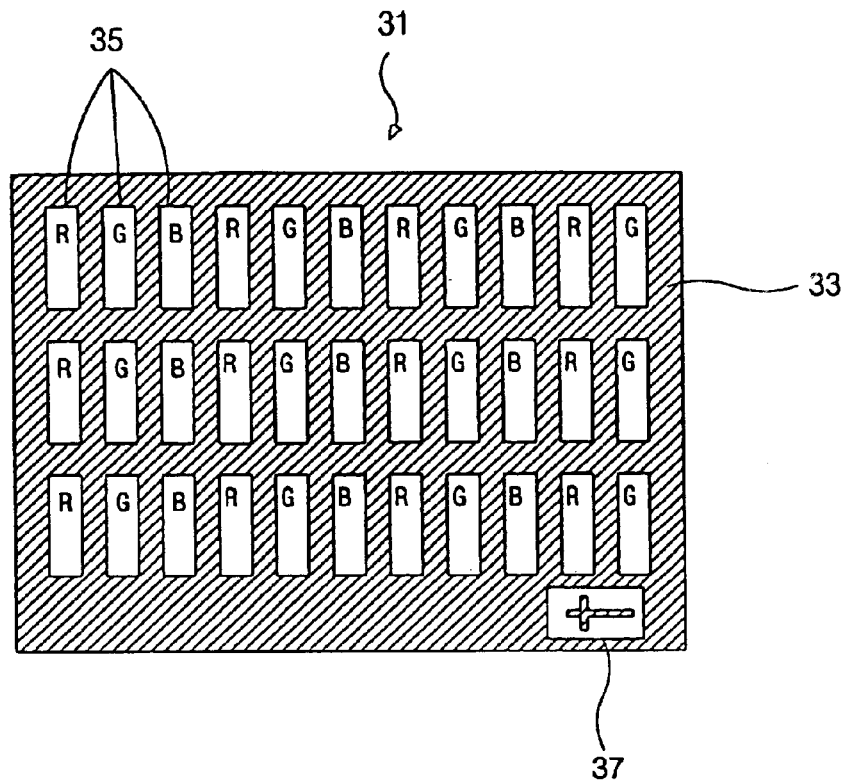
FIG. 2 is a schematic plan view illustrating a conventional color filter substrate of a liquid crystal display device.
Figure 4A:
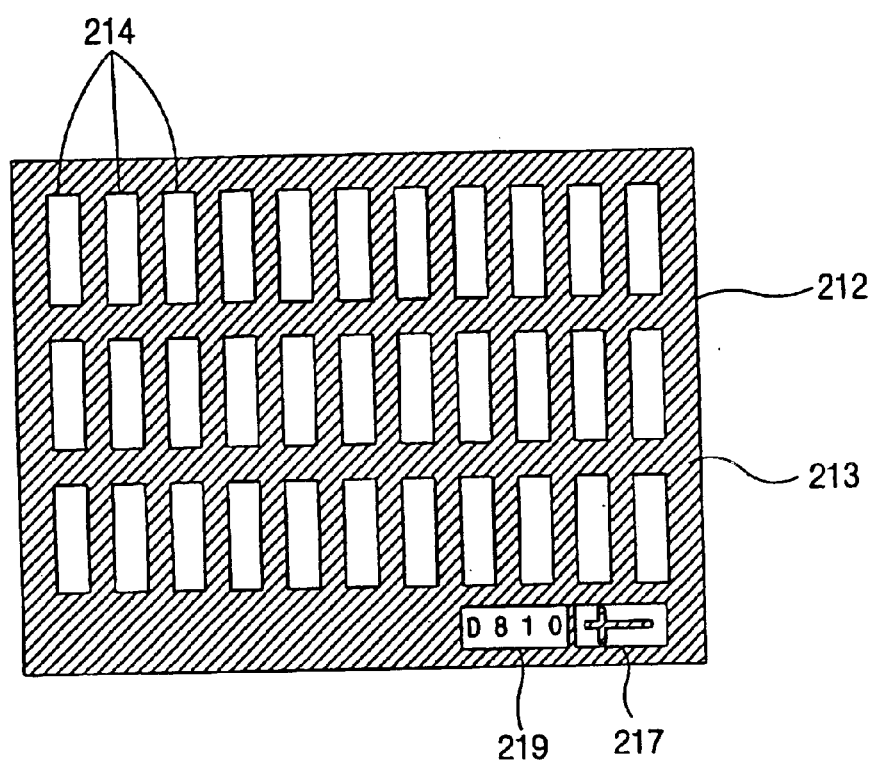
FIGS. 4A and 4B are schematic plan views illustrating process steps of fabricating the color filter substrate according the preferred embodiment of the present invention.
Figure 4B:
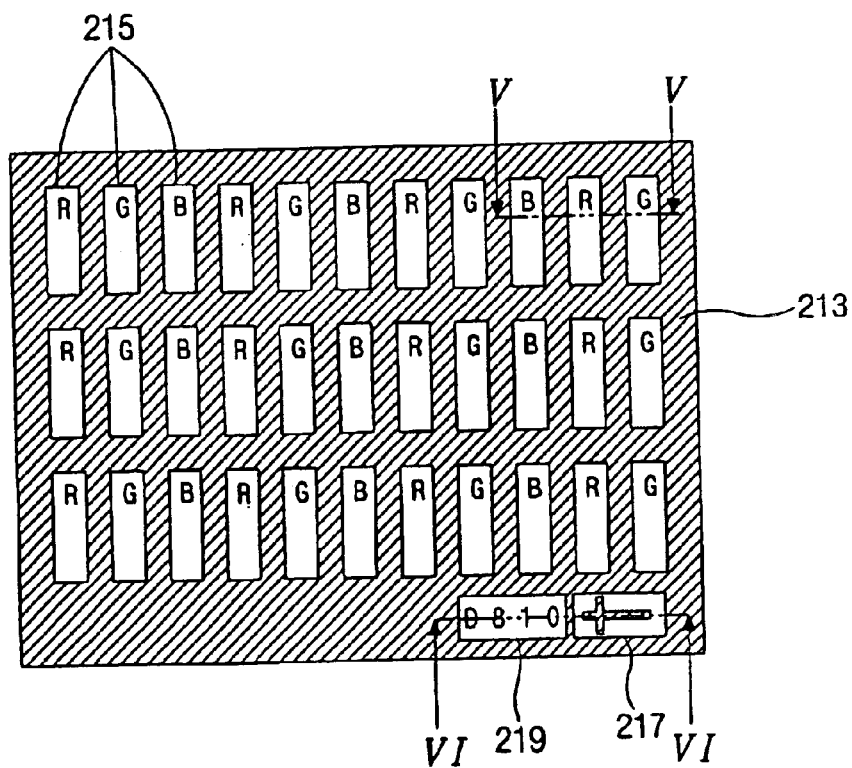

FIGS. 4A and 4B schematically show steps of fabricating the color filter substrate according to the present invention. Referring to FIG. 4A, chrome oxide ($CrO_2$) and chrome (Cr) are preferably deposited on a transparent substrate 212 after cleaning the transparent substrate 212. A resin such as a carbon-base organic material may also be used. Subsequently, the black matrix 213 is formed by patterning the double-layer ($Cr/CrO_2$) or the resin, for example. Moreover, color filter patterns 214 are formed for the color filters in a later step. If chrome oxide ($CrO_2$) and chrome (Cr) are used, they are simultaneously etched by the etchant. Since the black matrix 213 is related to the aperture ratio, the prevention of leakage current caused by the reflected light should be considered, and the assembly margin should also be considered when fabricating the LCD device. In particular, the black matrix 213 usually corresponds to the TFT portion and to the gate and date line portions. The black matrix 213 covering the color filter patterns 214 is removed such as by etching to open the color filter patterns 214. During the patterning process of the black matrix 213, the identification mark 219 is also formed by patterning the portion of the black matrix 213 that does not affect the image display. The alignment key 217 is also formed for aligning the color filter substrate 211 to the array substrate (see 22 of FIG. 1). The identification mark 219 is used to store information about the color filter.

FIG. 4B shows a step of forming red, green and blue color filters 215 preferably using a photolithography process. In this process, the color resist is used as a photoresist. The red, green and blue color filters 215 are simultaneously formed, respectively, using the mask process. The color resist is generally a negative photoresist in which the non-exposure portion is removed. Accordingly, the red, green and blue color filters 215 are formed by performing the photolithography process three times. Subsequently, an overcoat layer may be formed on the color filters and a transparent conductive material such as ITO (indium-tin-oxide) is deposited to form a transparent common electrode (see FIG. 5A).

Figure 5A:
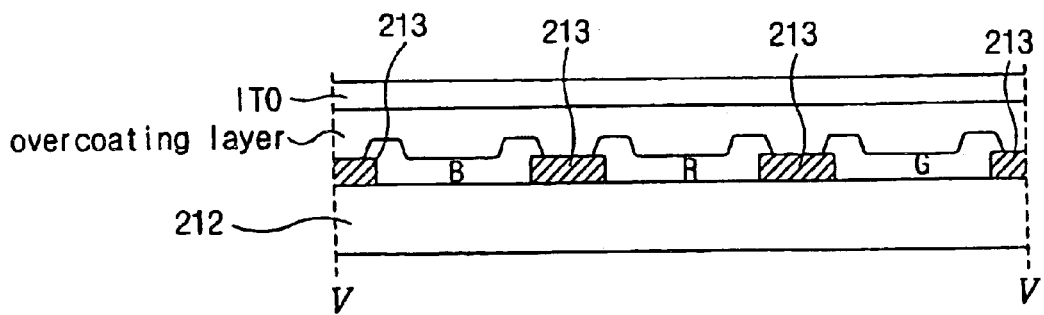
FIG. 5A is cross-sectional view of the color filters taken along line V—V of FIG. 4B.

FIG. 5A shows a cross-sectional view of the RGB color filters in FIG. 4B. On a transparent substrate 212, color filters 215 are formed separated by a black matrix 213. Then, an ITO layer is formed over the color filters 215. An overcoat layer may be formed between the ITO layer and the color filter layer 215.

Figure 5B:
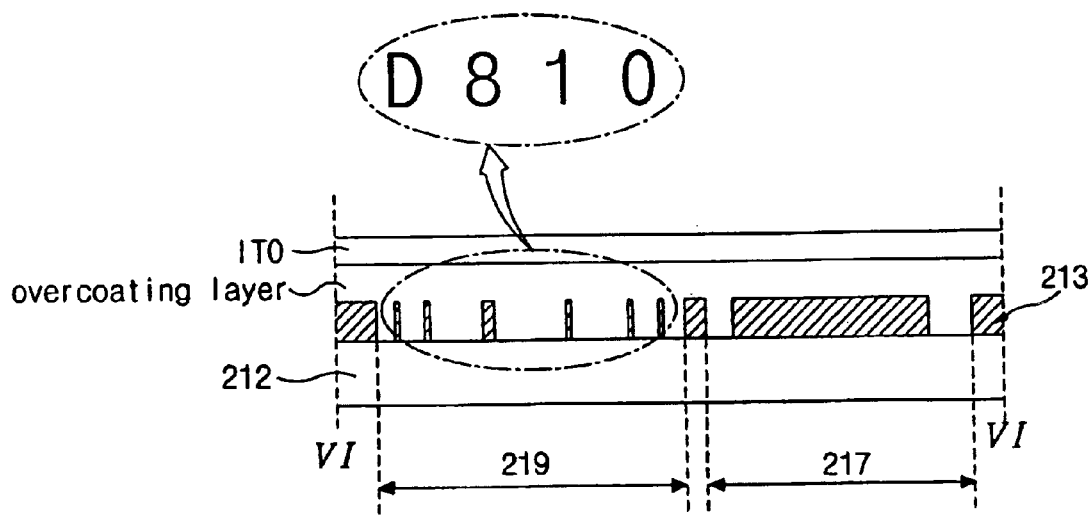
FIG. 5B is a cross-sectional view of the identification mark and alignment key portions taken along line VI—VI of FIG. 4B.

FIG. 5B shows a cross-sectional view of the identification mark and the alignment key portions. In this example, the identification mark 219 is "D810" preferably formed with the black matrix 213. The alignment key 217 is also preferably formed with the black matrix 213.

In accordance with the color filter substrate of the present invention, the manufacturer, the color filter type, the fabrication method and the type of black matrix are easily identified should a need arise, such as when a defect occurs in the color filter substrate, using the identification mark formed in the color filter substrate. Furthermore, the method of fabricating a color filter substrate of the present invention has the following advantages.

First, since the color filter type is easily identified using the identification mark formed during the process, quality control becomes much easier and the product history is easily discerned. Second, since an accurate color filter substrate is used for the preferred LCD device (by checking the identification mark), productivity increases. Third, since the color filter substrate may be quickly sent back to the exact manufacturer when a defect is found in the color filter substrate, yield increases.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a color filter substrate for use in a liquid crystal display device, the method comprising:
    forming a black matrix on a substrate;
    patterning the black matrix so as to form an identification mark, an alignment key and color filter patterns, wherein the identification mark and alignment key are disposed in a non-display area at a periphery and near a corner of the substrate;
    forming red color filters in red color filter patterns of the black matrix;
    forming green color filter in green color filters patterns of the back matrix; and
    forming blue color filters in blue color filter patterns of the back matrix;
    wherein the red, green and blue color filters constitute a display area where color images are shown.

2. A method according to claim 1, wherein the black matrix includes chrome (Cr).

3. A method according to claim 1, wherein the black matrix includes chrome and chrome oxide double layer.

4. A method according to claim 1, wherein the black matrix includes a resin having carbon.

5. A method according to claim 1, wherein the identification mark includes a sign.

6. A method according to claim 1, wherein the identification mark includes a character.

7. A method according to claim 6, wherein the character includes an alphabet and a number.

8. A method according to claim 1, wherein the identification mark stores information for at least one of a manufacturer, a color filter type, a fabrication method and a type of black matrix.

9. A method according to claim 1, wherein the identification mark stores information for any combination of a manufacturer, a color filter type, a fabrication method and a type of black matrix.

10. A method according to claim 1, wherein the identification mark and the alignment key are formed at a periphery of the substrate.

11. A method according to claim 1, further including a transparent conductive layer over the color filter.

12. A method according to claim 1, further including an overcoat layer between the transparent conductive layer and the color filter.

13. A method of fabricating a liquid crystal display device, the method comprising:
    forming a black matrix on a first substrate;
    patterning the black matrix so as to form an identification mark at a periphery and near a corner of the substrate and a plurality of color filter patterns;
    forming red color filters in red color filter patterns of the black matrix;
    forming green color filter in green color filters patterns of the back matrix;
    forming blue color filters in blue color filter patterns of the back matrix;
    forming a transparent conductive layer over the red, green and blue color filters; and
    assembling the first substrate to a second substrate.

14. A method according to claim 13, wherein the black matrix further includes an alignment key at the periphery of the first substrate.

15. A method according to claim 13, wherein the black matrix includes chrome (Cr).

16. A method according to claim 13, wherein the black matrix includes chrome and chrome oxide double layer.

17. A method according to claim 13, wherein the black matrix includes a resin having carbon.

18. A method according to claim 13, wherein the identification mark includes a sign.

19. A method according to claim 13, wherein the identification mark includes a character.

20. A method according to claim 19, wherein the character includes an alphabet and a number.

21. A method according to claim 13, wherein the identification mark stores information for at least one of a manufacturer, a color filter type, a fabrication method and a type of black matrix.

22. A method according to claim 13, wherein the identification mark stores information for any combination of a manufacturer, a color filter type, a fabrication method and a type of black matrix.

23. A method according to claim 13, wherein the identification mark and the alignment key are formed at a periphery of the substrate.

* * * * *